Figure 1:
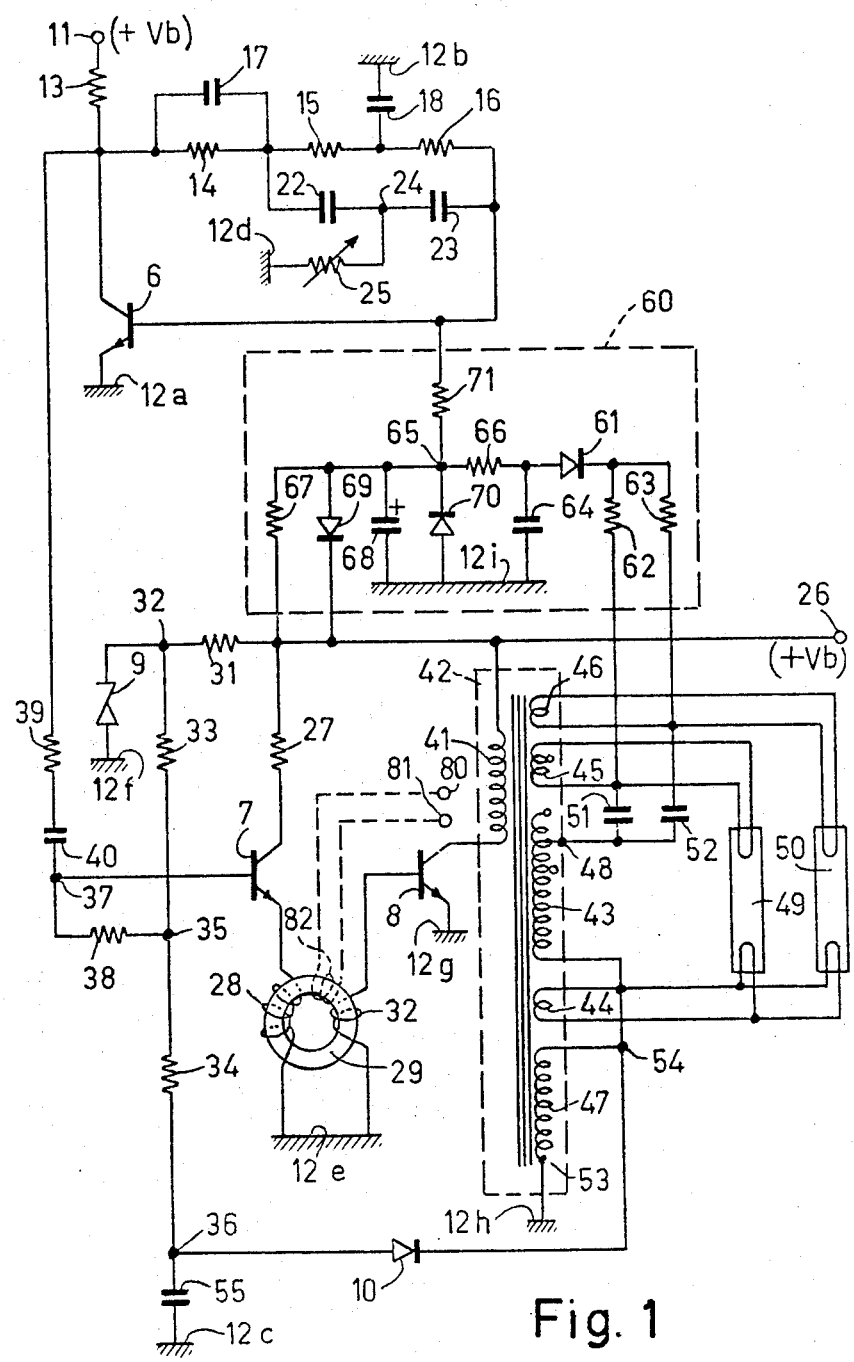

United States Patent [19]
Souvay

[11] 3,774,074
[45] Nov. 20, 1973

[54] ARRANGEMENT FOR SUPPLYING AT LEAST ONE GAS AND/OR VAPOUR DISCHARGE LAMP

[75] Inventor: Andre Souvay, Evreux, France

[73] Assignee: U.S. Philips Corporation, New York, N.Y.

[22] Filed: July 12, 1972

[21] Appl. No.: 270,988

[30] Foreign Application Priority Data
July 13, 1971 France .............................. 7125738
Jan. 25, 1972 France .............................. 7202436

[52] U.S. Cl. ......... 315/239, 315/DIG. 5, 331/113 A
[51] Int. Cl. .......................................... H05b 37/00
[58] Field of Search ................. 315/DIG. 5, DIG. 7, 315/239; 331/52, 54, 56, 113.1

[56] References Cited
UNITED STATES PATENTS
3,193,726  7/1965  Powell, Jr. .................. 315/DIG. 5
3,196,340  7/1965  Genuit ........................ 315/DIG. 5
3,345,580  10/1967  Tracy .............................. 331/52

*Primary Examiner*—Roy Lake
*Assistant Examiner*—Lawrence J. Dahl
*Attorney*—Frank R. Trifari

[57] ABSTRACT

The invention relates to an arrangement provided with a dc-ac converter for supplying lamps, in which the converter is controlled by an auxiliary oscillator. According to the invention the waveform of the output voltage of the auxiliary oscillator is adjustable so that an adaptation of the converter to a different lamp load is possible. It has also been described that the auxiliary oscillator is stopped in case of the no-load condition of the converter.

7 Claims, 3 Drawing Figures

ARRANGEMENT FOR SUPPLYING AT LEAST ONE GAS AND/OR VAPOUR DISCHARGE LAMP

The invention relates to an arrangement for supplying at least one gas and/or vapour discharge lamp, particularly a low-pressure mercury vapour discharge lamp, which arrangement is provided with a dc-ac converter including a first transistor and with an auxiliary oscillator for controlling said first transistor, while the main electrode circuit of the first transistor includes a primary winding of a transformer and the lamp is connected to a secondary winding of this transformer.

Arrangements of the kind described are used, for example, in vehicles such as buses or railway wagons.

A known arrangement of the above-mentioned kind is described, for example, in French Pat. No. 1,323,449. A drawback of this known arrangement, which includes a self-oscillating converter, is that it is only suitable for one given lamp load. When the actual lamp load deviates therefrom, the frequency differs from the normal frequency of the converter and the converter operates in a less favourable range. The situation may even occur that a converter adapted to supply a 13-Watt lamp is not suitable for supplying a 6-Watt lamp.

An object of the invention is to provide an arrangement of the kind described in the preamble which is better suitable for lamp loads of different wattages.

According to the invention an arrangement for supplying at least one gas and/or vapour discharge lamp, particularly a low-pressure mercury vapour discharge lamp, which arrangement is provided with a dc-ac converter including a first transistor and with an auxiliary oscillator for controlling said first transistor, while the main electrode circuit of the first transistor includes a primary winding of a transformer and the lamp is connected to a secondary winding of this transformer is characterized in that the converter is of the driven type and that the auxiliary oscillator includes a series arrangement of an impedance and a second transistor arranged between two terminals of a direct voltage source, an input control circuit of the converter being connected to a junction between the impedance and the second transistor, a control circuit of the second transistor being connected to the same junction and being provided with a variable circuit element so that a variation of the variable circuit element in the control circuit of the second transistor leads to a variation of the waveform of the voltage across the input control circuit of the converter.

An advantage of an arrangement according to the invention is that when the value of the lamp load is altered the ratio between the conducting period and the cut-off period of the first transistor can be adjusted to a new valve by recontrolling with the aid of the variable circuit element in the control circuit of the second transistor. In fact, the waveform of the output voltage of the auxiliary oscillator and hence the control of the converter varies due to this recontrol.

The operation of the converter can therefore be satisfactorily adapted to the new load.

The invention is based on the recognition of the fact that with a variation of the waveform the base of the first transistor can be maintained at a potential during comparatively long or short time intervals at which this transistor is conducting.

It is feasible that the frequency of the output voltage of the auxiliary oscillator in case of variation of the waveform of this output voltage remains substantially constant.

In a preferred embodiment of an arrangement according to the invention in which the control circuit for the second transistor includes a fixed capacitor, while the variable circuit element in this control circuit is a variable resistor.

An advantage of this preferred embodiment is that the auxiliary oscillator may be relatively simple.

In the last-mentioned embodiment of an arrangement according to the invention both the waveform of the output voltage of the auxiliary oscillator and the frequency of this output voltage will undergo a variation in case of recontrolling the variable circuit element in the control circuit of the second transistor. This may be effected, for example, to cause a ballast impedance in series with the lamp to vary automatically in value whereby the converter is adapted even better to a new lamp load.

When the lamp load is to be varied at a given instant the adaptation of the converter to the new load may be realised by recontrolling the variable circuit element in the control circuit of the second transistor. When, however, the lamp load may change at an arbitrary instant, for example, when one of two parallel-arranged lamps becomes defective or is taken out of its holder, the following preferred embodiment may be used to advantage.

In this preferred embodiment of an arrangement according to the invention the transformer of the converter is also provided with a secondary auxiliary winding which forms part of a series arrangement of a rectifier and a second capacitor which capacitor is arranged at one end in series with the input control circuit of the converter and at the other end is connected to the negative terminal of the direct voltage source.

An advantage of this preferred embodiment is that the converter is to some extent adapted to the new load in case of variations in the lamp load occurring at arbitrary instants.

The last-mentioned arrangement is especially advantageous when using an auxiliary oscillator having a variable waveform of the output voltage, because the waveform which still leads to an acceptable operation of the converter in case of defect of one of the lamps can be adjusted in advance.

The following may be noted for the sake of explanation. In a situation known in the art two parallel-arranged lamps of a given wattage were used for reasons of safety instead of one lamp having the double wattage. When in that case, for example, a converter for, for example, two lamps of 13 Watts was used, the detrimental situation might occur that if one of these lamps did not ignite, for example, because it was defective or had been taken out of its holder, the frequency of the converter changed to such an extent that the second lamp which was being supplied was overloaded and consequently became soon inoperative.

A further advantage of the last-mentioned preferred embodiment according to the invention, provided with a secondary auxiliary winding and a second capacitor, is that the brightness of the lamp is only slightly dependent on variations in the value of the direct voltage supplying the converter.

In a further preferred embodiment according to the invention in which also a third transistor is provided, this third transistor is present between the input control circuit of the converter and the base of the first transistor and this in such a manner that the main electrode circuit of the third transistor is in series with the primary winding of a coupling transformer, the base of the first transistor being connected to the secondary winding of this coupling transformer.

An advantage of this preferred embodiment is that the third transistor may serve as a pre-amplifier so that the circuit elements of the auxiliary oscillator may be proportioned to be smaller.

In a further preferred embodiment of an arrangement according to the invention the secondary winding of the transformer whose primary winding is included in the main electrode circuit of the first transistor is provided with taps.

An advantage thereof is that not only the series arrangement of a discharge lamp and a ballast adapted for a given supply voltage can be connected to the converter, but also combinations which are adapted for a different voltage. Furthermore the taps of the secondary winding of the transformer of the converter can be chosen to be such that lamps having various kinds of preheated electrodes can be connected thereto.

A further preferred embodiment of an arrangement according to the invention is characterized in that an auxiliary arrangement is present which has a junction connected through a second resistor to the base of the second transistor, which junction is also connected to an RC circuit whose resistor is connected to one of the terminals of the direct voltage source, and in which this junction is also connected to a circuit section comprising a rectifier and a third capacitor, which section is furthermore connected to an electrode of one of the discharge lamps so that in the presence of the lamp load the auxiliary arrangement does not have substantially any influence on the voltage of the base of the second transistor and in the absence of this lamp load the auxiliary arrangement produces a voltage across the base of the second transistor maintaining this transistor permanently in a given conducting state.

An advantage of this preferred embodiment is that the auxiliary arrangement causes the auxiliary oscillator to stop when the converter comes in its no-load state.

Figure 2:
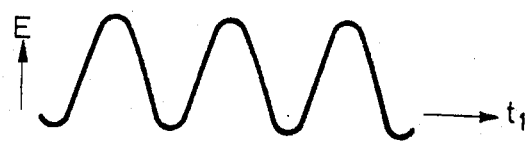
Figure 3:

In order that the invention may be readily carried into effect, some embodiments thereof will now be described in detail by way of example with reference to the accompanying diagrammatic drawings in which:

FIG. 1 shows an electrical circuit diagram of an arrangement according to the invention, FIG. 2 shows the waveform of the output voltage of an auxiliary oscillator in the arrangement according to FIG. 1, FIG. 3 shows the waveform of the output voltage of the auxiliary oscillator after variation of the adjustment of this auxiliary oscillator.

In FIG. 1 reference numeral 8 denotes a first npn-transistor of a driven dc-ac converter. The input terminals of this converter are denoted by 26 and, inter alia, 12g.

Reference numeral 6 denotes a second npn-transistor which forms part of an auxiliary oscillator. The auxiliary oscillator serves for controlling the converter. This auxiliary oscillator is fed from the same direct voltage source as the converter. The input terminals of the auxiliary oscillator are denoted by 11 and 12a. Terminal 26 of the converter and terminal 11 of the auxiliary oscillator are both connected to the positive terminal of the direct voltage source having a potential of $+V_b$.

A third npn-transistor is denoted by the reference numeral 7. As transistor 8, this transistor 7 is associated with the converter. Transistor 7 serves as a pre-amplifier for transistor 8.

Reference numeral 9 denotes a Zener diode with the aid of which a reference voltage is generated for the control circuit of the third transistor 7.

A diode 10 is included in a control branch which is connected to a secondary auxiliary winding 47 of a transformer.

Firstly the auxiliary oscillator will be referred to. The collector of transistor 6 is connected through a charge resistor 13 to the positive terminal 11 of the direct voltage source. The emitter of this transistor 6 is connected to the negative terminal 12a of this direct voltage source. The base of transistor 6 is connected to a control circuit which commences at a junction between the resistor 13 and the collector of this transistor 6 and which successively comprises three series-arranged resistors 14, 15 and 16. Finally resistor 16 is connected to the said base of transistor 6. Resistor 14 is shunted by a capacitor 17. A capacitor 18 is connected to a junction between the two resistors 15 and 16 which have the same resistive value. The other side of this capacitor 18 is connected to a terminal 12b which is likewise connected to the negative terminal of the direct voltage source. A series arrangement of two capacitors 22 and 23 is connected in parallel with the series arrangement of the two resistors 15 and 16. A variable resistor 25 is connected at one end to a junction 24 between the capacitors 22 and 23 and at the other end to a terminal 12d which in turn leads to the negative terminal of the direct voltage source.

The following may be noted with reference to the converter. The collector of transistor 7 is connected through a limiting resistor 27 to the positive input terminal 26. The collector of this transistor 7 is connected through a primary winding 28 of an auxiliary transformer 29 to the negative terminal 12e.

A resistor 31 is connected at one end to the connection between the positive terminal 26 and the limiting resistor 27 and at the other end to a point 32 connected to the cathode of Zener diode 9. The anode of this Zener diode 9 is connected to the negative terminal 12f of the direct voltage source. A series arrangement of a fixed resistor 33 and a variable resistor 34 is provided between point 32 and a point 36 which is associated with a control circuit. A point 35, between the above-mentioned resistors 33 and 34, is connected through a further resistor 38 to the point 37 which is connected to a branch leading to the base of transistor 7 as well as to an input control circuit of the converter. This input control circuit includes a series arrangement of a resistor 39 and a capacitor 40.

Furthermore a primary winding 41 of a transformer 42 is connected to terminal 26. The other side of winding 41 is connected to the collector of a transistor 8 whose emitter is connected to the negative terminal 12g of the direct voltage source. The base of transistor 8 is connected through a secondary winding 32 of the auxiliary transformer 29 to the negative terminal 12e. Instead of the direct connection between the primary winding 41 and the collector of transistor 8 a different connection may optionally be chosen in which the primary winding 41 is connected to the collector of transistor 8 through a terminal 80 and an additional winding 82 of the auxiliary transformer 29 as well as the terminal 81. This winding 82 may then also aid to render transistor 8 conducting.

Furthermore transformer 42 is provided with a plurality of secondary windings 43, 44, 45, 46 and 47. Winding 43 is provided with different taps for supplying a suitable voltage for the low-pressure mercury vapour discharge lamps 49 and 50. In the relevant case the tap 48 is used through which the two lamps, in series with ballast capacitors 51 and 52, are fed.

Windings 44 to 46 serve to feed the pre-heated electrodes of the lamps 49 and 50. As is shown for winding 45, these windings may also be provided with taps so as to be able to feed lamps having deviating electrode pre-heating voltages.

Winding 47 is connected at one end through a point 53 to the negative terminal 12h of the direct voltage source and at the other end through a point 54 to one end of the winding 43 as well as to the cathode of diode 10. The anode of diode 10 is connected to point 36 which is connected through a capacitor 55 to the negative terminal 12c.

Reference numeral 60 denotes an auxiliary arrangement whose task is to stop the auxiliary oscillator when there is no load connected to the secondary side of transformer 42. The auxiliary arrangement is provided with a delay circuit so that only several seconds after the absence of the transformer load the auxiliary oscillator is stopped. Due to the presence of this delay circuit an ignition of the lamps 49 and 50 is not inhibited when the total arrangement is switched on.

A diode 61 of the auxiliary arrangement 60 is connected through two resistors 62 and 63 to an electrode of the lamp 49 and to an electrode of the lamp 50, respectively. The other side of diode 61 is connected through a capacitor 64 to the negative terminal 12i as well as through a resistor 66 to a junction 65. Furthermore an RC-circuit consisting of a resistor 67 which is connected to the positive terminal 26 and a capacitor 68 which is connected to the negative terminal 12i is connected to this junction 65. Resistor 67 is shunted by a diode 69. A second diode is arranged between the negative terminal 12i and the junction 65. Junction 65 is furthermore connected through a resistor 71 to the base of transistor 6 of the auxiliary oscillator.

FIG. 2 shows the alternating voltage section (E) of the waveform of the voltage across the collector of transistor 6 for the case where variable resistor 25 (see FIG. 1) was adjusted in such a manner that this waveform was substantially sinusoidal.

FIG. 3 likewise shows the alternating voltage section (E) of the waveform of the voltage across the collector of transistor (6) for the case where variable resistor 25 was adjusted in such a manner that the positive section of voltage E is relatively longer and the negative section of this voltage is relatively shorter than in the case of the sine wave.

In an auxiliary oscillator in which a waveform variation is realised without frequency variation the division of the time axes of FIGS. 3 and 3 may be the same. In an auxiliary oscillator as shown in FIG. 1 the frequency variation is of course to be taken into account when the time axes of FIG. 2 and 3 are divided. In the case of FIG. 1 the waveform of FIG. 2 corresponds to a frequency of the auxiliary oscillator of 15 KHz and that of FIG. 2 corresponds to 20 kHz. Consequently, the division of the time axis of FIG. 3 must then be the same as the 15/20 part of that of FIG. 2.

Due to the ratio to be modified of the positive relative to the negative part of the waveform the control of transfer 8 may be varied in such a manner that the converter is better adapted to a new lamp load.

The operation of the arrangement of FIG. 1 is as follows.

As already described the waveform of the voltage across the collector of transistor 6 of the auxiliary oscillator varies as a function of the value of variable resistor 25 in the control circuit of this transistor.

Zener diode 9 maintains the potential of point 32 ar a fixed value above that of the negative terminal 12c of the direct voltage source.

During half periods when the voltage across point 54 is negative, a current flows through diode 10 so that a negative voltage appears through capacitor 55 at point 36. This voltage is the more negative as the voltage across winding 47 has a larger amplitude. The potential divider 33, 34 then also determines the potential on point 35, and through resistor 38 it determines the potential on the base of transistor 7. Fluctuations in the secondary voltages of transformer 42 may be automatically countered in this manner.

A positive part of the voltage across the junction of resistor 13 and transistor 6 renders transistor 7 conducting. As a result a current flows through winding 28 of the auxiliary transformer 29 which renders transistor 8 conducting through winding 32. Consequently, a current flows through the primary winding 41 of transformer 42. The lamps 49 and 50 are then fed through the secondary windings. The capacitances of capacitors 51 and 52 were chosen to be such that a series resonance at approximately 17 to 18 kHz occurred, which corresponds approximately to the centre of the frequency range of the auxiliary oscillator including transistor 6. After the positive current flowing through the secondary windings and transformer 42, a negative current flows through these windings as a result of the oscillatory circuit character of the lamp circuit. Meanwhile the auxiliary oscillator has already cut off transistor 8 again.

When the converter described is to be used for feeding discharge lamps of a different wattage, the converter can be satisfactorily adapted to this new lamp load by readjusting the variable resistor 25 in the control circuit of the auxiliary oscillator. This is because transistor 8 may be maintained conducting for a longer period, for example, for a larger lamp load (due to the different waveform of the auxiliary oscillator) so that the larger energy required on the secondary side of transformer 42 can be provided. A great advantage thereof is that a considerable limitation of the assortment of converters can be obtained.

The effect of the variation of the frequency of the auxiliary oscillator relative to the frequency of the lamp load circuit is less important.

When one of the lamps becomes defective the other lamp continues to operate. The current intensity in the remaining lamp increases, however, to a slight extend without assuming serious forms of overload.

A fluctuation of the battery voltage $V_b$ is also counteracted by the control circuit including the secondary winding 47.

The auxiliary arrangement 60 roughly operates as follows. If the lamps 49 and 50 are present and operate, a current flows periodically via resistor 67 through the circuit elements 65 and 66, diode 61 and resistors 62 and 63. In this case proportioning is such that this current at point 65 realizes a potential which is substantially equal to that of the negative terminal 12i or perhaps 0.7 Volt higher. This potential at point 65 does not influence the normal operation of the auxiliary oscillator including transistor 6.

When, however, the lamp load disappears, capacitors 51 and 52 are charged and no further current flows through diode 61. Capacitor 68 is then charged through resistor 67 so that the potential on point 65 becomes and remains positive. As a result the base of transistor 6 is permanently brought to a positive voltage so that the auxiliary oscillator discontinues to oscillate. Since charging of capacitor 68 requires several seconds, the auxiliary oscillator is stopped in a delayed manner.

After switching off the total arrangement the capacitor 68 may be discharged, for example, through diode 69. Diode 70 serves as a safety.

In a practical embodiment the circuit elements were formed as follows:

Zener diode 9 zener voltage: 15 Volt
Resistor 13: 1 kOhm
Resistor 14: 100 kOhm
Resistors 15 and 16: 1.5 kOhm each
Resistor 33: 5.6 kOhm
Resistor 34: 330 kOhm
Resistor 38: 5.6 kOhm
Resistor 39: 1.8 kOhm
Capacitor 40: 10 nF
Capacitor 17: 22 nF
Capacitor 18: 56 nF
Capacitors 23, 24: 2.2 nF
Resistor 25: 1 kOhm
Resistor 27: 120 Ohm
Resistor 31: 2.2 kOhm
Lamps 49 and 50: 13 Watt each
Capacitors 51 and 52: 10 nF each
Capacitor 55: 0.1 $\mu$F
Battery voltage Vb: 24 Volt
Resistors 62 and 63: 470 kOhm
Capacitor 64: 0.1 $\mu$F
Resistor 66: 56 kOhm
Resistor 67: 100 kOhm
Capacitor 68: 100 $\mu$F
Resistor 71: 27 kOhm.

What is claimed is:

1. An arrangement for supplying at least one gas and/or vapour discharge lamp, particularly a low pressure mercury vapour discharge lamp, comprising:
   a dc-ac converter, said converter being of the driven type, including a first transistor forming a part of the converter, said transistor having an electrode coupled to a primary winding of a transformer, said lamp being connected to a secondary winding of said transformer, said converter also having an input control circuit; and
   an auxiliary oscillator for driving said converter, said oscillator including a second transistor and an impedance being connected in series and arranged between two terminals of a d.c. voltage source, the output voltage of said oscillator appearing at the junction of the impedance and second transistor, the junction also being coupled to the input control circuit of said converter, said second transistor also having a variable circuit element for controlling the shape of the output voltage of the oscillator so that a variation of the variable circuit element results in a variation of the output waveform of the oscillator which in turn causes a change in conductive time of the converter.

2. An arrangement as claimed in claim 1 in which the control circuit of the second transistor includes a fixed capacitor, and wherein the variable circuit element in said control circuit is a variable resistor.

3. An arrangement as claimed in claim 1 in which the transformer of the converter is also provided with a secondary auxiliary winding, characterized in that the secondary auxiliary winding forms part of a series arrangement of a rectifier and a second capacitor, which second capacitor is arranged at one end in series with the input control circuit of the converter and at the other end is connected to the negative terminal of the direct voltage source.

4. An arrangement as claimed in claim 1 in which a third transistor is also present, the third transistor being between the input control circuit of the converter and the base of the first transistor and this in such a manner that the main electrode circuit of the third transistor is in series with the primary winding of a coupling transformer, the base of the first transistor being connected to the secondary winding of said coupling transformer.

5. An arrangement as claimed in claim 1 wherein the secondary winding of the transformer whose primary winding is included in the main electrode circuit of the first transistor is provided with taps.

6. Arrangement as claimed in claim 1 wherein an auxiliary arrangement is present which has a junction connected through a second resistor to the base of the second transistor, which junction is also connected to an RC-circuit whose resistor is connected to one of the terminals of the direct voltage source, and in which said junction is also connected to a circuit section comprising a rectifier and a third capacitor which section is furthermore connected to an electrode of one of the discharge lamps so that in the presence of the lamp load the auxiliary arrangement does not have substantially any influence on the voltage of the base of the second transistor and in the absence of said lamp load the auxiliary arrangement produces a voltage across the base of the second transistor maintaining said transistor permanently in a given conducting state.

7. An arrangement for supplying at least one gas and/or vapour discharge lamp, particularly a low pressure mercury vapour discharge lamp, comprising:
   a transformer, having a primary winding and at least one secondary winding adapted to being coupled to at least one lamp;
   a dc-ac converter having a first transistor adapted to being driven between conduction and nonconduction, the output of said transistor being coupled to a primary of said transformer;
   an auxiliary oscillator including a second transistor, said second transistor having a phase shift control network connected from said second transistor output to the transistor input, the output of said second transistor being coupled to the input of said converter, said control network having a variable resistance element for adjusting the voltage waveform out of said oscillator, said voltage waveform being capable of changing the conduction of said first transistor as said variable resistance is varied, so that a selectable amount of power may be delivered to said lamp.

* * * * *